United States Patent [19]
Schroeder

[11] Patent Number: 5,738,486
[45] Date of Patent: Apr. 14, 1998

[54] APPARATUS FOR UNLOADING BLOCKS OF BLANKS THAT ARE STACKED ON PALLETS, WITH SEPARATORS BEING INTERPOSED BETWEEN THE BLOCKS

[75] Inventor: Arno Schroeder, Iserlohn-Letmathe, Germany

[73] Assignee: Topack Verpackungstechnik GmbH, Schwarzenbek, Germany

[21] Appl. No.: 650,141

[22] Filed: May 17, 1996

[30] Foreign Application Priority Data

May 18, 1995 [DE] Germany .................. 195 18 256.1

[51] Int. Cl.⁶ .................................................. B65G 59/02
[52] U.S. Cl. ...................... 414/796; 901/47; 294/907
[58] Field of Search ................................ 414/796, 796.6, 414/796.9; 294/907; 901/46, 47, 35

[56] References Cited

U.S. PATENT DOCUMENTS

| | | | |
|---|---|---|---|
| 4,439,674 | 3/1984 | Amberny et al. | 294/907 |
| 4,551,053 | 11/1985 | Ishibashi | 414/796 |
| 4,746,255 | 5/1988 | Roccabianca et al. | 414/793.8 |
| 4,789,295 | 12/1988 | Boucher, Jr. et al. | 414/497 |
| 4,911,608 | 3/1990 | Krappitz et al. | 414/796.9 |
| 4,917,559 | 4/1990 | van der Schoot | 414/796.6 |
| 5,040,942 | 8/1991 | Brinker et al. | 414/796 |
| 5,046,773 | 9/1991 | Modesitt | 294/907 |
| 5,244,340 | 9/1993 | Pizzi et al. | 414/796 |

FOREIGN PATENT DOCUMENTS

| | | | |
|---|---|---|---|
| 3305606 | 8/1984 | Germany . | |
| 0251633 | 11/1987 | Germany | 294/907 |
| 9110004 | 9/1991 | Germany . | |
| 9111787 | 9/1991 | Germany . | |

OTHER PUBLICATIONS

Volker Giesslar; Optisch-elektronische ... Wellpappe; May 1969 pp. 626–628.
Reflex scanning units; Jun. 30, 1983.

*Primary Examiner*—Karen B. Merritt
*Assistant Examiner*—Douglas Hess
*Attorney, Agent, or Firm*—Robert W. Becker & Associates

[57] ABSTRACT

An apparatus for unloading blocks that are stacked on pallets and have flat separators interposed between the blocks is provided. The apparatus has a three-dimensionally controlled and movable pick-up head on which is disposed an approximately horizontally oriented insertion tool that terminates in a pointed insertion tip. The insertion tool is adapted by means of a horizontal movement to extend below a respectively to be removed block of blanks. In order to recognize an improperly taken up block of blanks prior to further processing thereof, a sensor unit is provided that cooperates with a reflective element that is disposed on the underside of the insertion tool. This makes it possible to inspect if a portion of the bottom blank is disposed below the insertion tool. A block of blanks that has been recognized as improper is initially separated out.

6 Claims, 3 Drawing Sheets

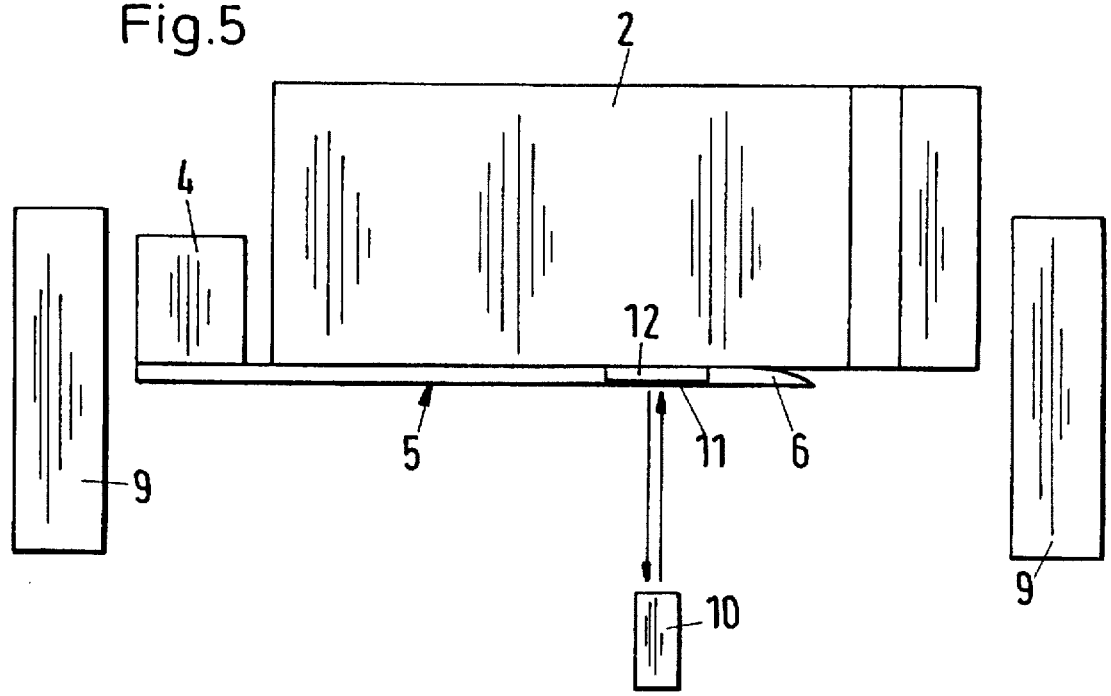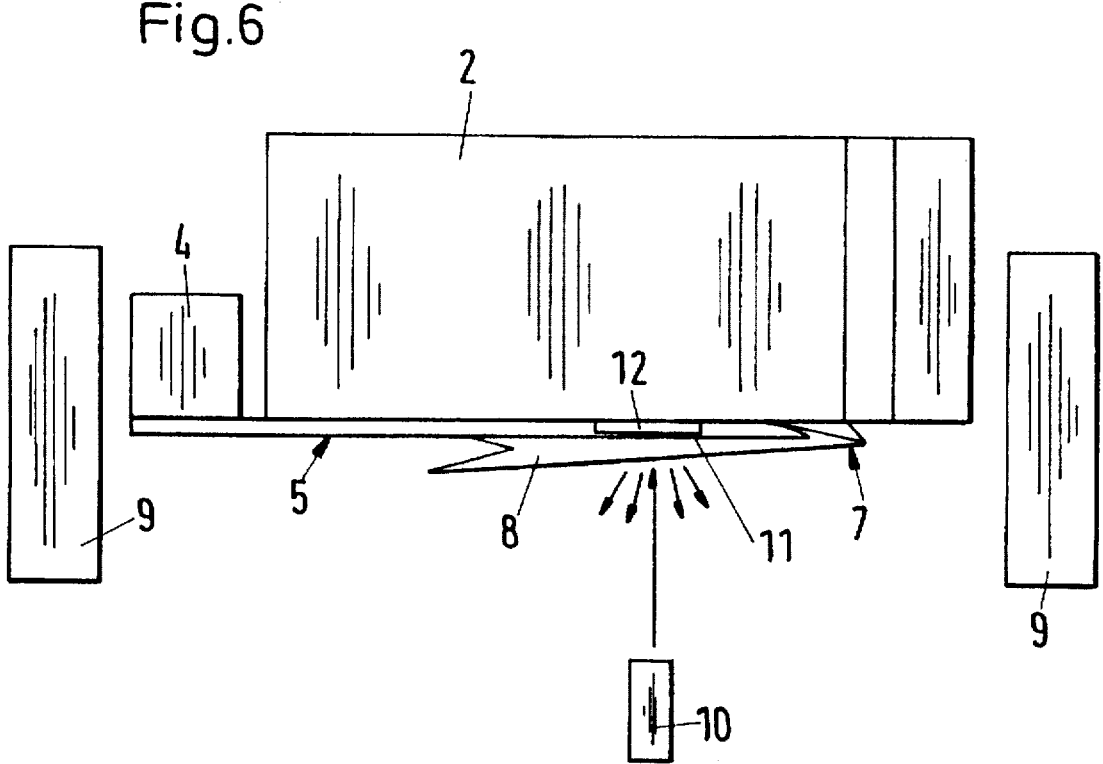

ated and movable pick-up head on which is disposed an approximately horizontally oriented insertion tool that terminates in a pointed insertion tip or end. The insertion tool is adapted, via a horizontal movement, to extend below and to take up a respective block of blanks that is to be removed.

APPARATUS FOR UNLOADING BLOCKS OF BLANKS THAT ARE STACKED ON PALLETS, WITH SEPARATORS BEING INTERPOSED BETWEEN THE BLOCKS

BACKGROUND OF THE INVENTION

The present invention relates to an apparatus for unloading blanks that are stacked on pallets in the manner of blocks, with flat separators being interposed between the blocks of blanks. The apparatus includes a three-dimensionally controlled and movable pick-up head on which is disposed an approximately horizontally oriented insertion tool that terminates in a pointed insertion tip or end. The insertion tool is adapted, via a horizontal movement, to extend below and to take up a respective block of blanks that is to be removed.

Apparatus of this general type for unloading blocks of blanks disposed on pallets are known from U.S. Pat. No. 5,040,942. This patent discloses a pick-up head on which is secured an insertion tool that is slightly pivotably mounted about a horizontal axis. The pivoting movement of the insertion tool is monitored by a switch lever that by means of a switch interrupts the lowering movement of the pick-up head as soon as the insertion tool is pivoted about a prescribed angle against an adjustable spring force. These apparatus, further modifications of which are disclosed in DE-U 91 11 787 and DE-U 91 10 004, operate in the vast majority of cases without interruption, i.e. the insertion tip of the insertion tool enters exactly into the narrow gap between the separator and the bottom blank of the block.

However, there are instances in which the insertion tool slightly misses this gap and the insertion tip runs into the bottom blank. This does not prevent the further progress of unloading, since the deformation of the bottom blank does not affect the other blanks of the block disposed thereabove. Thus, in such a case this block can be taken up from the separator. However, disruptions occur in the subsequently provided packaging station where the bottom, deformed blank cannot be processed.

It is therefore an object of the present invention, for an apparatus for unloading blocks of blanks that are stacked on pallets, and have flat separators interposed between the blocks, to provide means to recognize those blocks of blanks that have been incorrectly taken up prior to their further processing.

BRIEF DESCRIPTION OF THE DRAWINGS

This object, and other objects and advantages of the present invention, will appear more clearly from the following specification in conjunction with the accompanying schematic drawings, in which:

FIG. 5 is a side view, where the block of blanks has been correctly taken up by the apparatus of FIG. 2, and shows the monitoring of the block by means of a sensor; and FIG. 6 is a side view, where the block of blanks has been incorrectly taken up by the apparatus of FIG. 2, and shows the inspection of the block by means of a sensor.

SUMMARY OF THE INVENTION

The apparatus of the present invention is characterized primarily by a sensor unit that cooperates with a reflective element that is disposed on the underside of the insertion tool, with the sensor unit having a transmitting element, which is designed for the reflective element, as well as an associated receiving element.

The present invention is based on the recognition that in those instances where the insertion tip of the insertion tool runs into the bottom blank of the block of blanks, this bottom blank, starting from its end face, is initially slit open. This is possible because the blanks are composed of multi-layer cardboard and have a thickness of from 0.3 to 0.7 mm. During the course of the further introduction of the insertion tool, this slitting-open of the blank does not continue; rather, the slightly downwardly curved insertion tip or end of the insertion tool again exits the blank and during the remainder of its movement moves in the prescribed manner between the blank and the separator. At the same time, the entire length of the bottom blank is deformed and/or compressed. When the insertion tool reaches its end position in the horizontal direction, the block of blanks at first glance has a satisfactory appearance. It is only after a closer inspection that it can be seen that the bottom blank is partially slit open, and partially deformed, with a part of this bottom blank being disposed on the underside of the insertion tool. This fact is taken advantage of with the inventive apparatus, which provides a reflective element, which is disposed on the underside of the insertion tool, as well as a sensor unit that cooperates therewith, for monitoring or inspecting each individual block of blanks to check if a part of a blank is disposed on the underside of the insertion tool. In such a case, the corresponding block of blanks is not conveyed to the subsequent packaging station, but is first separated out in order to remove the destroyed blank.

A particularly reliable recognition of incorrectly taken up blocks of blanks is achieved if the reflective element is disposed within the front half of the insertion tool.

Pursuant to one specific embodiment of the inventive apparatus, the transmitting and receiving elements can be combined in a single sensor unit.

Finally, it is proposed pursuant to the present invention to use a light source as a transmitting element and an optical mirror as the reflective element.

Further specific features of the present invention will be described in detail subsequently.

DESCRIPTION OF PREFERRED EMBODIMENTS

Figure 1:
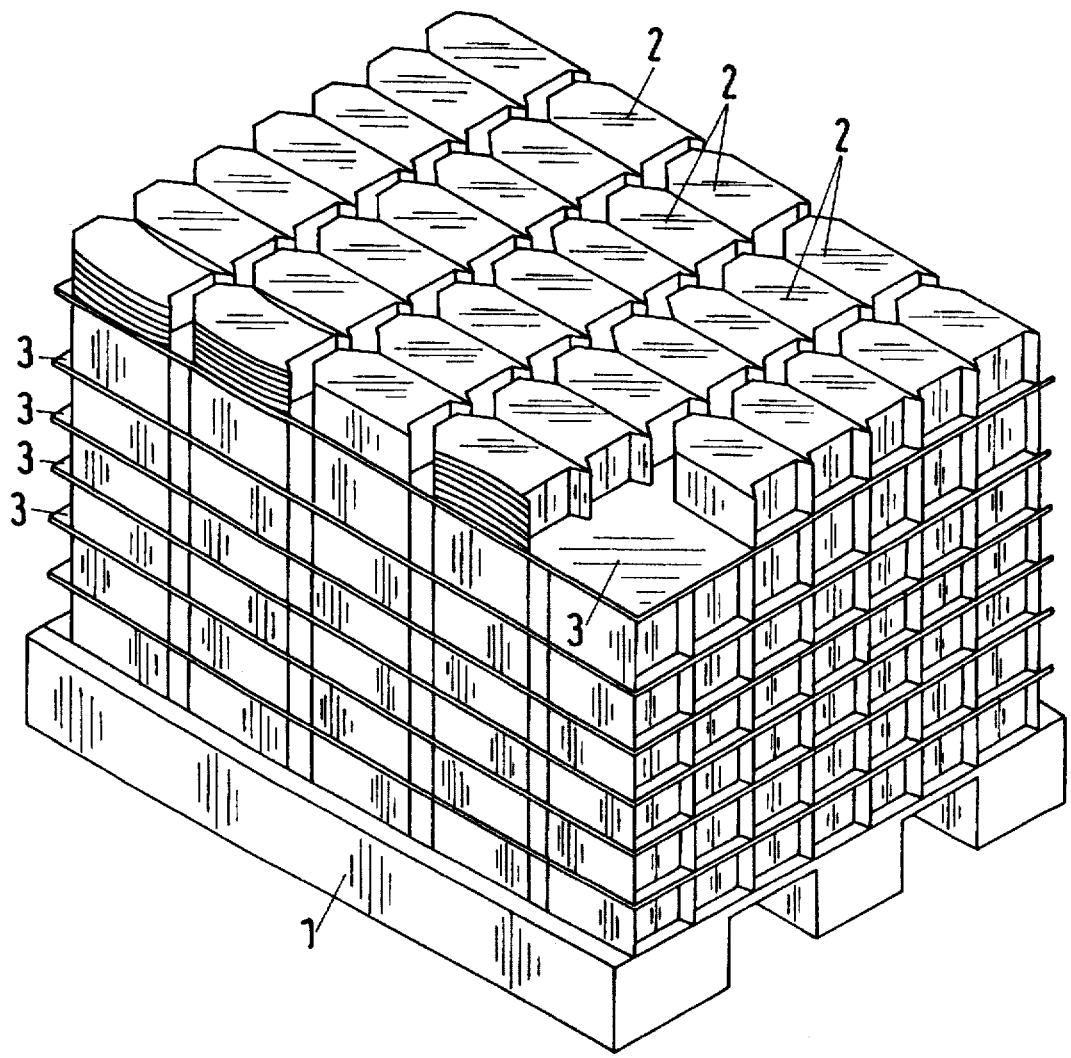
FIG. 1 is a perspective view of a conventional pallet that is loaded with blocks of blanks.

Referring now to the drawings in detail, FIG. 1 shows a pallet 1 on which are stacked a number of blocks 2 of blanks. Those blocks 2 of blanks that are stacked over one another are respectively separated from one another by an intermediate layer or separator 3 that covers the entire surface area of the pallet 1.

Figure 2:
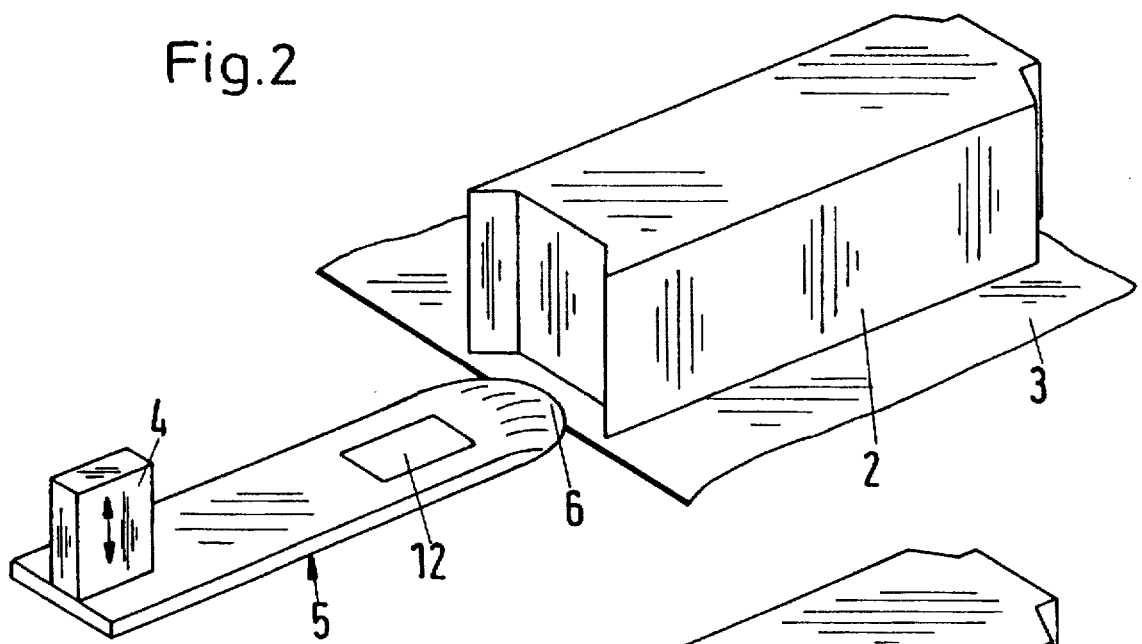
FIG. 2 is a perspective view of one exemplary embodiment of the inventive apparatus for unloading blocks of blanks that are stacked on pallets and have flat separators interposed between the blocks.

FIG. 2 shows how an individual block 2 of blanks can be taken up by means of an insertion tool 5 that is disposed on a three-dimensionally controlled movable pick-up head 4. For this purpose, the insertion tool 5 is lowered until its tapered or pointed insertion tip or end 6 rests upon the separator 3, which sticks out through the front beyond the block 2 of blanks. By means of the pick-up head 4, the insertion tool 5 is then moved horizontally in the direction toward the block 2 of blanks, during the course of which during a normal operation the insertion tip 6 enters the gap that is formed between the separator 3 and the lowermost blank of the block 2.

Figure 3:
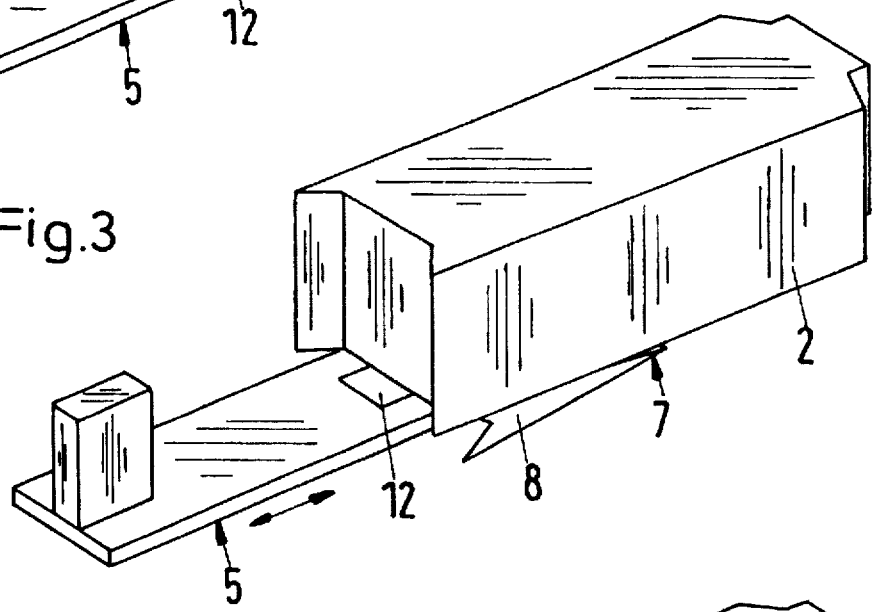
FIG. 3 shows the apparatus of FIG. 2 in a subsequent operating step.
Figure 4:
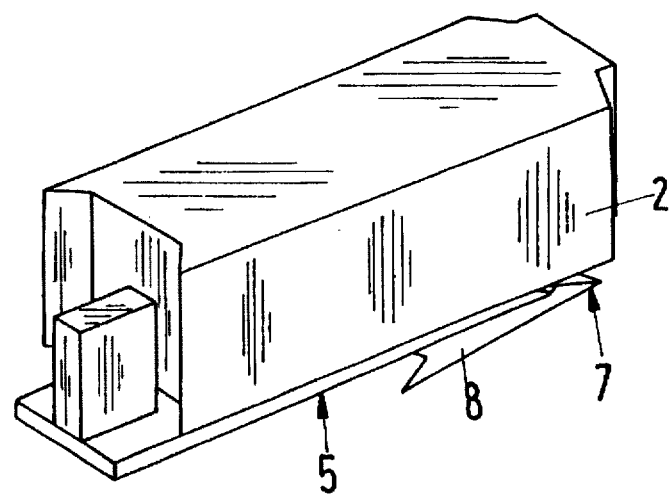
FIG. 4 shows the apparatus of FIG. 2 in a still later operating step.

However, as a deviation from this normal situation it is also possible in some cases that the insertion tip 6 of the insertion tool 5 does not pass below the bottom blank, but rather contacts this bottom blank directly and slits it open during the horizontal movement. The forces that act upon the bottom blank during this process lead to a partial deformation of this bottom blank 7, as illustrated in FIGS. 3 and 4. As a consequence thereof, a part 8 of the bottom blank 7 finally ends up below the insertion tool 5. Nonetheless, at the end of its horizontal travel the insertion tool 5 has completely taken up the block of blanks in the manner illustrated in FIG. 4. Unfortunately, were such a block 2 of blanks to be conveyed to a subsequent packaging station, at the latest at this location disruptions due to the destroyed bottom blank 7 would occur.

Each unloaded block 2 of blanks is therefore subjected to an inspection, the procedure of which will be described in detail subsequently with the aid of FIGS. 5 and 6.

FIG. 5 illustrates a block 2 of blanks that has been properly received; by means of the insertion tool 5 this block 2 is lowered into a registering station 9. Disposed in this registration station 9 below the insertion tool 5, is a sensor unit 10 that is comprised of a transmitting element as well as an associated receiving element. The transmitting element of the sensor unit 10 generates an optical signal that is directed against the bottom of a reflective element 11 that is disposed on the insertion tool 5. This reflective element 11 is a downwardly facing optical mirror, such as a reflective foil. To accommodate the reflective element 11, the insertion tool 5 is provided with a recessed portion 12, which can also be seen in FIGS. 2 and 3. The reflective element 11 is disposed behind the slightly downwardly curved insertion tip 6 within the front half of the insertion tool 5.

FIG. 6 demonstrates the inspection of a block 2 of blanks that has been improperly received. The partially slit-open, partially deformed or compressed bottom blank 7 has a part 8 thereof disposed below the insertion tool 5 and hence below the reflective element 11. Therefore, the optical signal that is given off by the transmitting element of the sensor unit 10 is not reflected by the reflective element 11, as a result of which an improperly received block 2 of blanks is recognized. This block 2 is thereupon removed from the registering station 9, which is disposed upstream from a packaging station, and the block is initially separated out for the purpose of removing the bottom blank 7.

The present invention is, of course, in no way restricted to the specific disclosure of the specification and drawings, but also encompasses any modifications within the scope of the appended claims.

What I claim is:

1. An apparatus for unloading blocks of blanks that are stacked on pallets, with separators being interposed between the blocks, said apparatus comprising:

a three-dimensionally controlled and movable pick-up head;

an approximately horizontally oriented insertion tool that is disposed on said pick-up head and terminates in a pointed insertion tip, said insertion tool being adapted via a horizontal movement to extend below and to take up one of said blocks of blanks that is to be removed;

a reflective element that is disposed on an underside of said insertion tool; and a sensor unit that is disposed beyond said pallet, whereby the sensor unit cooperates with said reflective element and is not disposed on said insertion tool, said sensor unit having a transmitting element, which is designed for said reflective element, as well as an associated receiving element all for detecting an error during the unloading of blanks.

2. An apparatus according to claim 1, wherein said reflective element is disposed within a front half of said insertion tool.

3. An apparatus according to claim 2, wherein said reflective element is disposed within a recessed portion of said insertion tool.

4. An apparatus according to claim 1, wherein said transmitting element and said receiving element are combined in a single sensor unit.

5. An apparatus according to claim 1, wherein said transmitting element is a light source and said reflective element is an optical mirror.

6. An apparatus according to claim 1, wherein said sensor unit is disposed in a registering station.

* * * * *